United States Patent [19]
Nagai

[11] Patent Number: 5,269,252
[45] Date of Patent: Dec. 14, 1993

[54] SHOCK SENSOR

[75] Inventor: Mami Nagai, Musashino, Japan

[73] Assignee: TEAC Corporation, Japan

[21] Appl. No.: 967,986

[22] Filed: Oct. 27, 1992

[30] Foreign Application Priority Data

Nov. 5, 1991 [JP] Japan .................. 3-090456[U]

[51] Int. Cl.$^5$ .............................................. G01P 15/04
[52] U.S. Cl. ........................................ 116/203; 73/492
[58] Field of Search ........................... 116/203; 73/492

[56] References Cited

U.S. PATENT DOCUMENTS

| | | |
|---|---|---|
| 3,145,571 | 8/1964 | Maynard et al. ............. 116/203 X |
| 3,418,964 | 12/1968 | Peterson ......................... 116/203 |
| 3,623,449 | 11/1971 | Knutson ......................... 116/203 |
| 4,060,004 | 11/1977 | Scholz et al. ................... 116/203 |
| 4,278,219 | 7/1981 | Finance ....................... 73/492 X |

FOREIGN PATENT DOCUMENTS 0588879 6/1947 United Kingdom ............ 116/203

Primary Examiner—Daniel M. Yasich
Attorney, Agent, or Firm—Andrus, Sceales, Starke & Sawall

[57] ABSTRACT

A shock sensor is able to detect an externally applied acceleration. A weight is fixed to a first end of a first supporting member. The weight is rotatably movable about an opposite end of the supporting member. A second supporting member, having an indicating portion, is provided under the first supporting member. A spring member is integrally formed with the second supporting member so as to hold the second supporting member either at an upper position to support the weight or at a lower position where a predetermined acceleration is detected. Whether or not the shock sensor has detected that an acceleration exceeding the predetermined value has been applied to the sensor is indicated by the position of the indicating portion.

6 Claims, 6 Drawing Sheets

SHOCK SENSOR

BACKGROUND OF THE INVENTION

The present invention relates to a shock sensor, and more particularly to a shock sensor which detects whether or not a shock force has been applied to the sensor and displays this fact.

When transporting a precision apparatus such as an electronics equipment unit by a truck and the like, a problem might happen in which the precision apparatus gets damaged by an externally applied shock force. In order to detect whether a shock has been applied, generally, a shock sensor for displaying this fact is attached to the precision apparatus before it is transported.

A conventional shock sensor of such an above type is, for example, the shock sensor having a structure shown in FIG. 1. When an acceleration (shock force) is applied to the shock sensor in a direction indicated by an arrow A, a U-shaped weight 2 provided in a box-like case 1 slides in the direction indicated by the arrow A to presses a leaf spring 3 and deform it in the direction indicated by the arrow A. When the acceleration exceeds a predetermined value, the leaf spring 3 is deformed into a reversely bent state from an original state due to buckling thereof. An indicating plate 4 provided on the leaf spring 3 is moved by the movement of the weight 2 to be maintained in a shock detected position opposite to a displaying window 1a. Since the indicating plate 4 is colored a bright color, such as red, it is easy to recognize whether or not the indicating plate 4 is at the shock detected position from outside by looking for such a bright color through the displaying window 1a. An example of this type of prior art sensor is disclosed in U.S. Pat. No. 3,623,449 issued Nov. 30, 1971 to Knutson.

In the above mentioned shock sensor, since the weight 2 slides inside the case 1, a friction resistance is generated between the weight 2 and the case 1. When the shock sensor is mass-produced, the respective friction resistances for such shock sensor units do not become exactly equal to each other. Accordingly, a dispersion of detected acceleration by means of the movement of weight 2 occurs; resulting in each sensor detecting an acceleration different from the predetermined value. Additionally, due to the relatively heavy weight of the indicating plate 4, the leaf spring 3 and the indicating plate 4 may return to their original positions, that is, their states before the acceleration is detected, when reverse acceleration is applied after the shock sensor has detected a predetermined acceleration. Therefore, there is a problem in that the conventional shock sensor has low reliability.

SUMMARY OF THE INVENTION

It is a general object of the present invention to provide a novel and useful shock sensor in which the above mentioned disadvantages are eliminated.

A more specific object of the present invention is to provide a shock sensor which does not mis-operate and can reliably detect whether or not there has been an acceleration and display this fact.

In order to achieve the above mentioned objects, a shock sensor according to the present invention has been provided which comprises:

a weight to which an acceleration is applied;

a first supporting member, movable between a first position and a second position, for supporting the weight; and a second supporting member, movable between a third position and a fourth position, for supporting an indicating portion, said second supporting member having a holding portion so it can be maintained at either said third position or said fourth position, and the second supporting member being moved together with the first supporting member when pressed by the first supporting member, the first supporting member begin at the first position and the second supporting member being at the third position before an acceleration is applied to the weight, and the second supporting member being moved to the fourth position by a movement of the first supporting member from the first position to the second position when a predetermined acceleration is applied to the weight.

According to the present invention, detection of an acceleration can be assured with a minimum dispersion from a predetermined acceleration value to be detected because the weight is supported by the first supporting member, thus eliminating friction resistance between the weight and the case, and the indicating plate is supported separately by the second supporting member. When a reverse acceleration is applied to the shock sensor after the sensor has detected a predetermined acceleration, the indicating plate 4 is maintained at a detected position by means of a holding portion provided on the second supporting member; thus there is no possibility of a mis-operation; whether or not an acceleration has occurred can be reliably detected.

Other objects, features and advantages of the present invention will become more apparent from the following detailed description when read in conjunction with the accompanying drawings.

BRIEF DESCRIPTION OF THE DRAWINGS

FIG. 8A showing a state before an acceleration is detected; FIG. 8B showing a state when an acceleration is being applied; FIG. 8C showing a state when a reverse acceleration is being applied; FIG. 8D showing a state when a reverse acceleration is no longer being applied.

DETAILED DESCRIPTION OF THE PREFERRED EMBODIMENT

Figure 1:
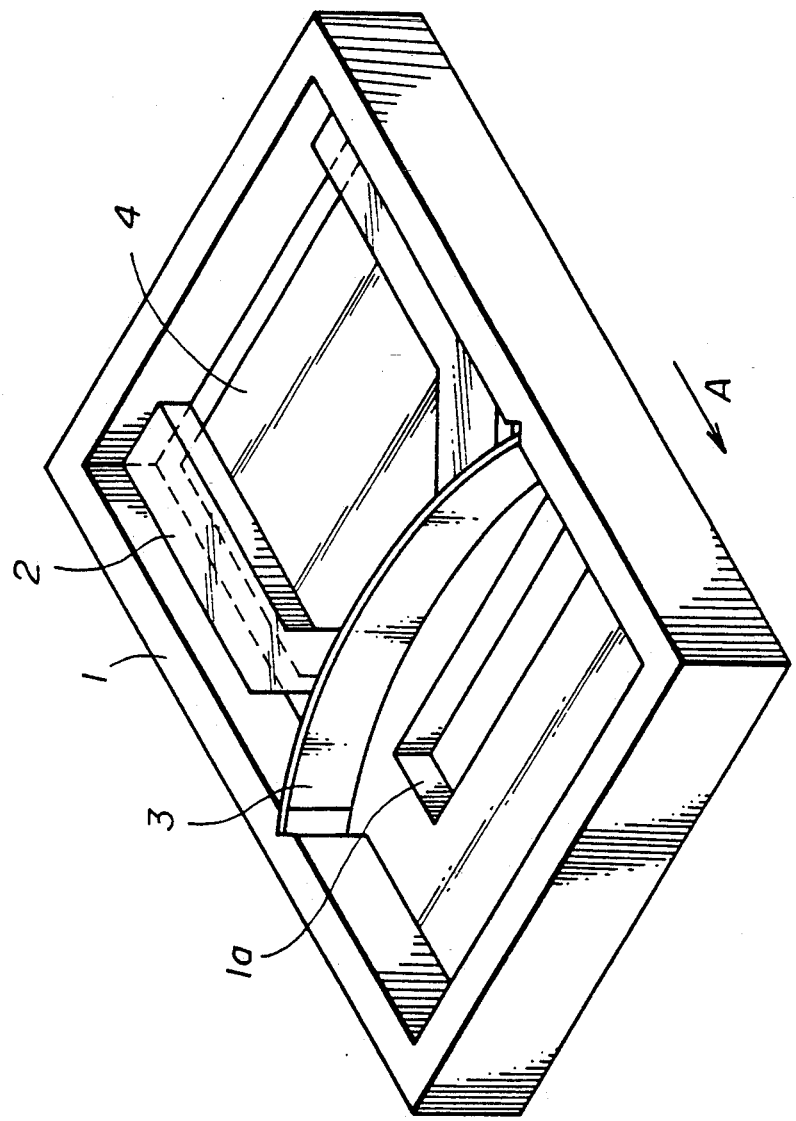
FIG. 1 is a perspective view of an example of a conventional shock sensor.
Figure 2:
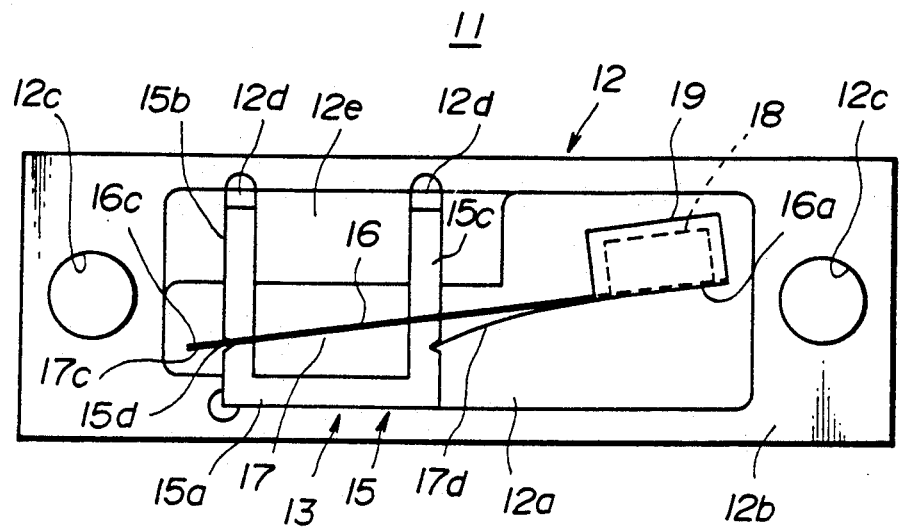
FIG. 2 is a front view of an embodiment of a shock sensor according to the present invention.
Figure 3:
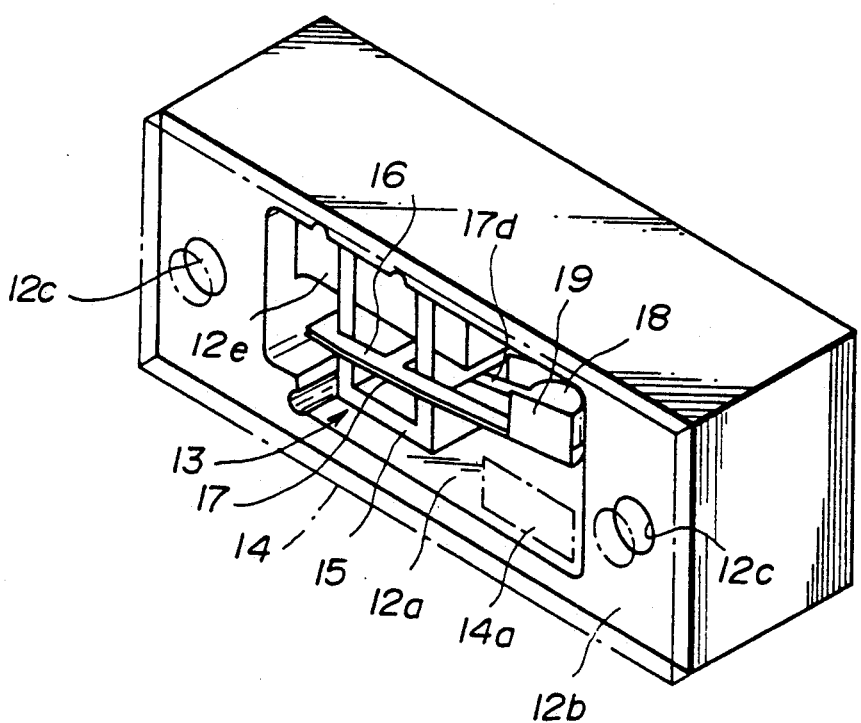
FIG. 3 is a perspective view of the shock sensor of FIG. 2.

An embodiment of a shock sensor according to the present invention is shown in FIG. 2 and FIG. 3. A shock sensor 11 comprises a box like case 12 and a sensor unit 13. The sensor unit 13 is accommodated in an accommodating portion 12a of the case 12. A lid 14 having a transparent window 14a (shown by a dotted chain line in FIG. 2) is fixed on a front face 12b of the case 12.

Figure 4:
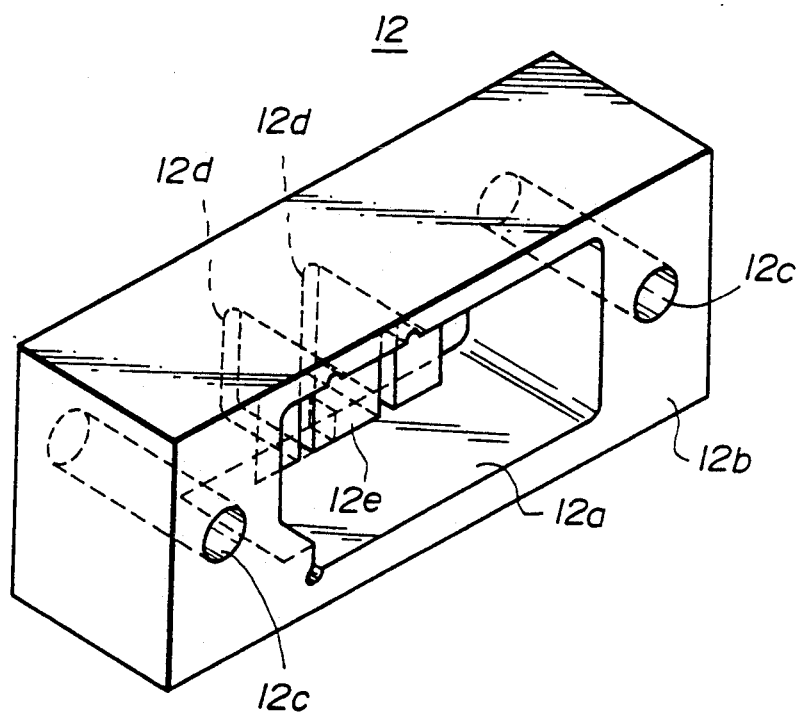
FIG. 4 is a perspective view of a case for the shock sensor of FIG. 2.

As best illustrated in FIG. 4, a fastening hole 12c is provided on each side of the case 12, the shock sensor 11 being fixed to an object by using these holes 12c by means of screw. The accommodating portion 12a is formed in the case 12 so that the case 12 has a space having a nearly rectangular shaped opening. A fixing portion 12e having grooves 12d provided for fixing the sensor unit 13 protrudes inside of the accommodating portion 12a.

Figure 5:
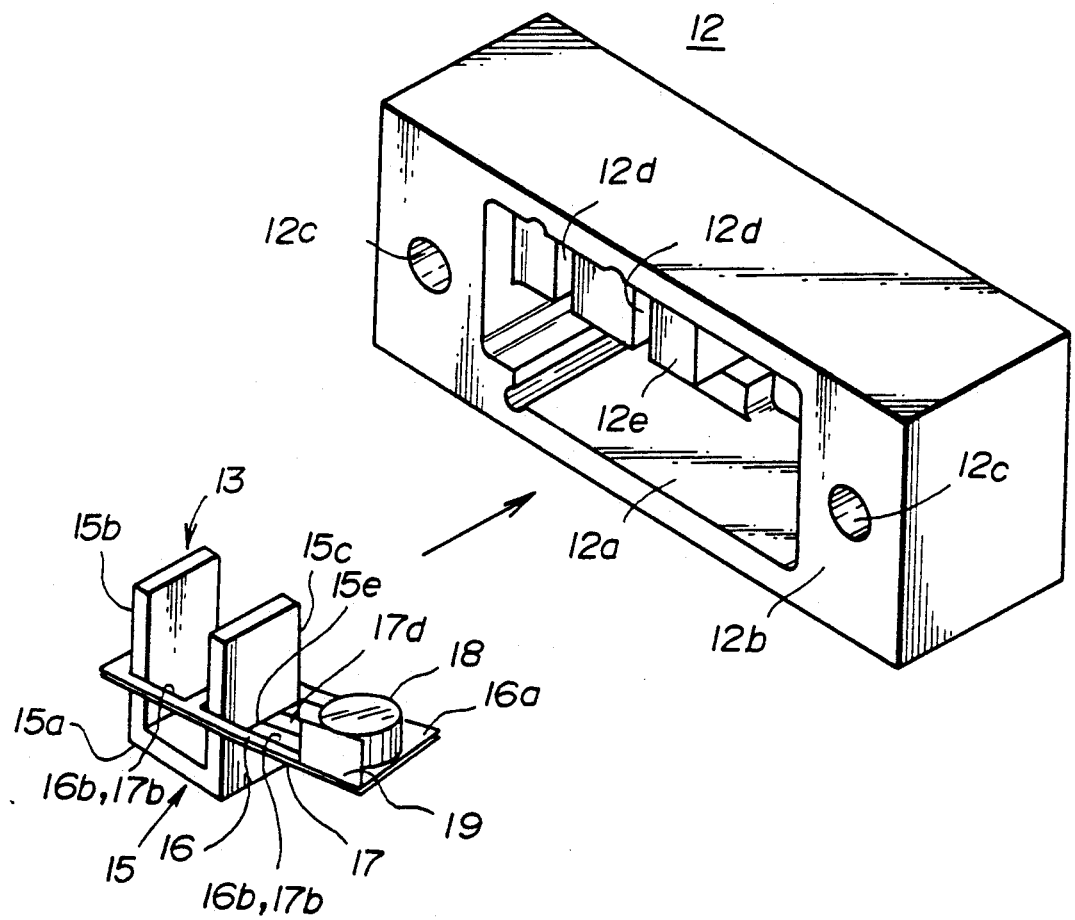
FIG. 5 is an exploded view showing a state where a sensor unit is being inserted in the case.

As shown in FIG. 5, the sensor unit comprises a U-shaped fixing member 15 and a pair of supporting members 16,17 (a first and a second supporting members), which are formed of thin metal plate and supported by the fixing member 15. A weight 18 is fixed to an end 16a of the first supporting member 16, and an indicating plate 19 is formed on a side of an end 17a of the second supporting member 17. Fixing member 15 is comprised of three fixing plates 15a, 15b, and 15c. Fixing plates 15b and 15c are substantially parallel plates corresponding to the two upwardly extending less of the "U". Fixing plates 15b and 15c rest on bottom fixing plate 15a, the latter corresponding to the cross-member of the "U". The fixing plates 15b and 15c have V-shaped grooves 15d and 15e on their respective side faces so as to support the supporting members 16 and 17.

The supporting member 16 and 17 are formed in nearly the same shape and are respectively provided with openings 16b and 17b into which the fixing plates 15b and 15c of the fixing member 15 are respectively inserted. The upper supporting member 16 is placed on an upper surface of the lower supporting member 17. Inner edges 16c and 17c of the openings 16b and 17b of the two supporting members 16 and 17 are joined together and engaged with the V-shaped groove 15d formed on a side face of the fixing plate 15b. Accordingly, the supporting members 16 and 17 are rotatably supported by the inner edges 16c and 17c so that the opposite sides of the supporting members 16 and 17 where the weight 18 is fixed can move up and down.

It is should be noted that the supporting member 16 provided with the weight 18 and the supporting member 17 provided with the indicating plate 19 are separate members which can move independently from each other.

The lower supporting member 17 is provided with a spring portion 17d (a holding portion) which extends from an inner edge of the opening 17b, and an edge of the spring portion 17d is engaged with the V-shaped groove 15e of the fixing plate 15c.

The sensor unit 13 of the above mentioned construction is, as indicated by an arrow in FIG. 5, inserted into the accommodating portion 12a of the case 12. When inserting the sensor unit 13 into the case 12, the respective ends of the fixing plates 15b and 15c are inserted into the grooves 12d and thus the sensor unit 13 is fixed at a predetermined position inside the case 12.

Figure 8A:
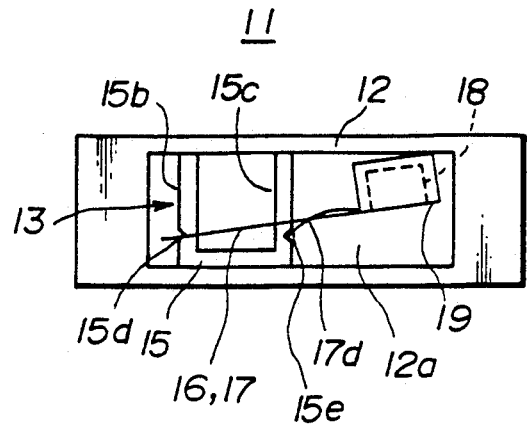
FIGS. 8A, 8B, 8C, 8D are front views of the sensor unit showing an operation.

In a state where the shock sensor 11 is assembled, as shown in FIG. 5 and FIG. 8A, the ends 16a and 17a of the supporting members 16 and 17 are maintained to be in positions higher than the V-shaped groove 15e. This is because a distance between an edge of the spring portion 17d and the inner edge of the supporting member 17 which is engaged with the V shaped groove 15d is slightly shorter than a distance between the two V shaped grooves 15d and 15e. Such a relationship between these distances results in the spring portion 17d being bent when it is assembled. That is, when assembling the sensor 11, the sensor unit 13 is assembled so that the spring portion 17d is bent upward into an arc-like shape, with the result that the ends 16a and 17a of the supporting members 16 and 17 located at positions higher than the groove 15e.

An operation of the sensor unit 13 will be described below. Before an acceleration is applied to the sensor unit 13, as shown in FIG. 5 and FIG. 8A, the supporting members 16 and 17 are maintained in positions in which their ends 16a and 17a are higher than the V-shaped groove 15e.

Figure 6:
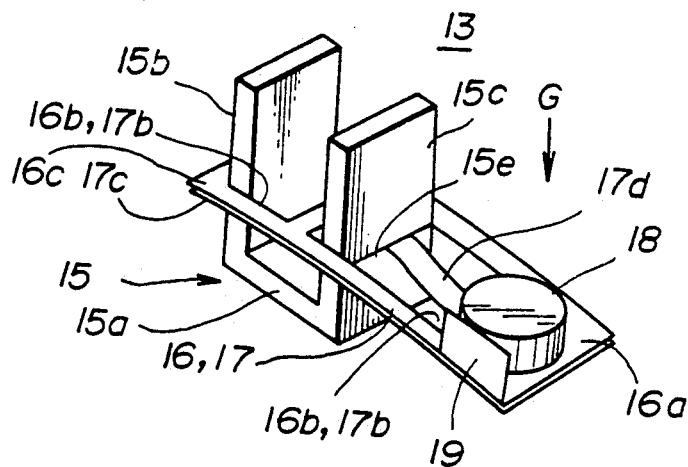
FIG. 6 is a perspective view showing an operation of the sensor unit when an acceleration is being detected.
Figure 8B:
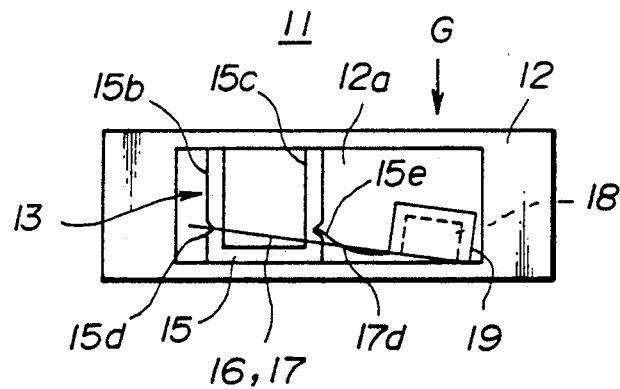

As shown in FIG. 6 and FIG. 8B, when a downward acceleration G is applied to the weight 18, a downward pressing force is applied to the end 16a of the upper supporting member 16, and the same pressing force applied to the supporting member 16 is then in turn applied to the end 17a of the lower supporting member 17. Accordingly, the ends 16a and 17a of the supporting members 16 and 17 move downward. When the pressing force exceeds a predetermined value and the ends 16a and 17a being to move a large distance, a buckling occurs in the spring portion 17d, which results in deformation of the spring portion 17d, from an arc-like shape bent upward to an arc-like shape bent downward. In this state, the ends 16a and 17a are in positions lower than the V-shaped groove 15e and the supporting members 16 and 17 are maintained in these positions by a downward elastic pressing force generated by the spring portion 17d.

At this time, the indicating plate 19 provided on the side of the end 17a of the supporting member 17 also moves to a position lower than the V shaped groove 15e, that is a shock detected position. The transparent window 14a of the lid 14 is provided in a position where the indicating plate 19 can be seen through the window 14a when the indicating plate 19 is at the lower shock detected position. Since the indicating plate 19 is colored with such bright colors as red or yellow, it is easy to recognize the indicating plate 19 when it is opposite to the window 14a, and accordingly, it can be instantly recognized that an acceleration greater than a predetermined value has been applied to the sensor 11 due to external shock or vibration.

In this embodiment, since the weight 18 is fixed to the supporting member 16, the supporting member 16 is directly pressed without any friction resistance between the weight 18 and the case 12, and the supporting member 17 is pressed at the same time, thus assuring that a reliable operation for detecting an acceleration can be performed.

Figure 7:
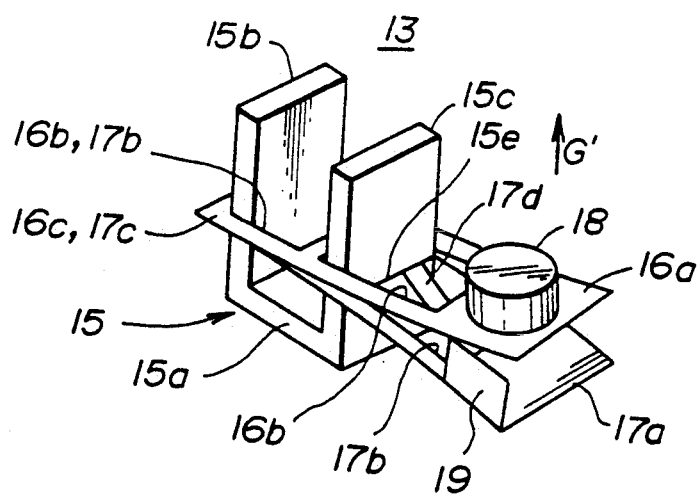
FIG. 7 is a perspective view showing an operation of the sensor unit when a reverse acceleration is being applied after the sensor unit has detected a predetermined acceleration.
Figure 8C:
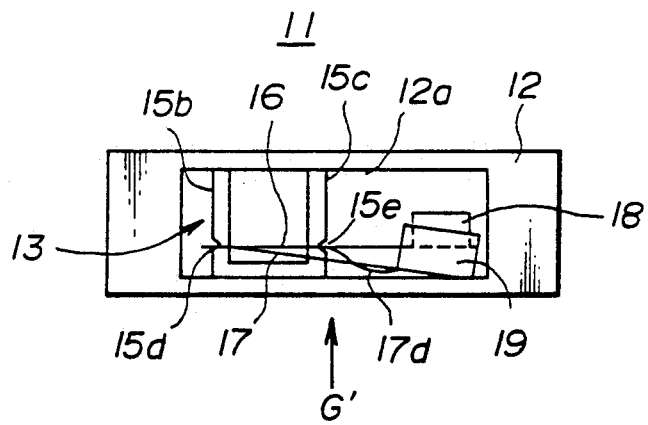

As shown in FIG. 7 and FIG. 8C, in a case where a reverse (upward) acceleration G' is applied after the acceleration detecting operation has been performed, the upper supporting member 16 moves upward while the lower supporting member 17 is maintained at the position lower than the V-shaped groove 15e by means of the spring portion 17d of the supporting member 17. Accordingly, the indicating plate 19 does not move from the lower shock detected position opposite to the window 14a, which position indicates an acceleration has been detected. As a result, even if a reverse acceleration G' is applied to the sensor 11 after the detection of the acceleration, the indicating plate 19 will not move away from the window 14a. Therefore, errors, such as an operator assumes the sensor has not detected an acceleration because the indicating plate 19 has moved away from the window 14a after an acceleration has been detected, are eliminated.

Figure 8D:
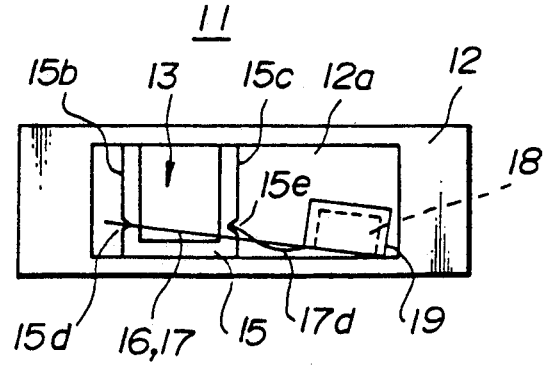

As shown in FIG. 8D, after the reverse acceleration G' is suppressed, the supporting member 16 having the weight 18 fixed thereon returns to the lower position. As mentioned above, the weight 18 and the indicating plate 19 are respectively supported by the supporting members 16 and 17 so that the weight 18 and the indicating plate 19 move downward together when an acceleration G is applied and the weight 18 independently moves upward when a reverse acceleration G' is applied.

As in the sensor of the present invention there is no friction resistance due to the sensor being provided with the above mentioned supporting members 16 and 17, the weight 18 is lighter and smaller than the weight of the above mentioned conventional sensor, and thus the sensor of the present invention is simpler and more compact than the conventional sensor.

The present invention is not limited to the specifically disclosed embodiment, and variations and modifications may be made without departing from the scope of the present invention.

What is claimed is:

1. A shock sensor, comprises:
    a weight to which an acceleration is applied;
    a first supporting member, movable between a first position and a second position, for supporting said weight near a first end of said first supporting means;
    a second supporting member, movable between said first position and said second position, for supporting an indicating portion near a first end of said second supporting member, said supporting member having a holding portion that maintains said second supporting member at either said first position or said second position, and second supporting member being moved together with said first supporting member by being pressed by said first supporting member;
    said first and second supporting members being at said first position before an acceleration is applied to said weight; and
    said second supporting member being moved to said second position by a movement of said first supporting member from said first position to said second position when said acceleration is applied to said weight.

2. The shock sensor of claim 1, wherein each of said first and second supporting members comprises a thin plate, said weight being fixed on an end of said first supporting member, and said first supporting member being located on a top surface of said second supporting member.

3. The shock sensor of claim 2, including a fixing member that supports said first and second supporting members, a second end of each of said first and second supporting members being engaged with said fixing member, and said first ends of said first and second supporting members being rotatably movable about said second ends of said first and second supporting members.

4. The shock sensor of claim 3, wherein said holding portion comprises a thin plate spring member integrally formed with said second supporting member, said spring member being held between said second supporting member and said fixing member in a position such that said spring member is elastically bent.

5. The shock sensor of claim 4, wherein said spring member has a first arc-like shape before an acceleration has been applied to said weight, and a second arc-like shape after an acceleration has been applied to said weight.

6. The shock sensor of claim 1, further comprising a case accommodating at least said first and second supporting members, said weight, and said indicating portion, said case having a transparent window at a position opposite to a position where said indicating portion is located when said second supporting member is at said second position so that said indicating portion can be recognized from outside of said case.

* * * * *